Figure 1:
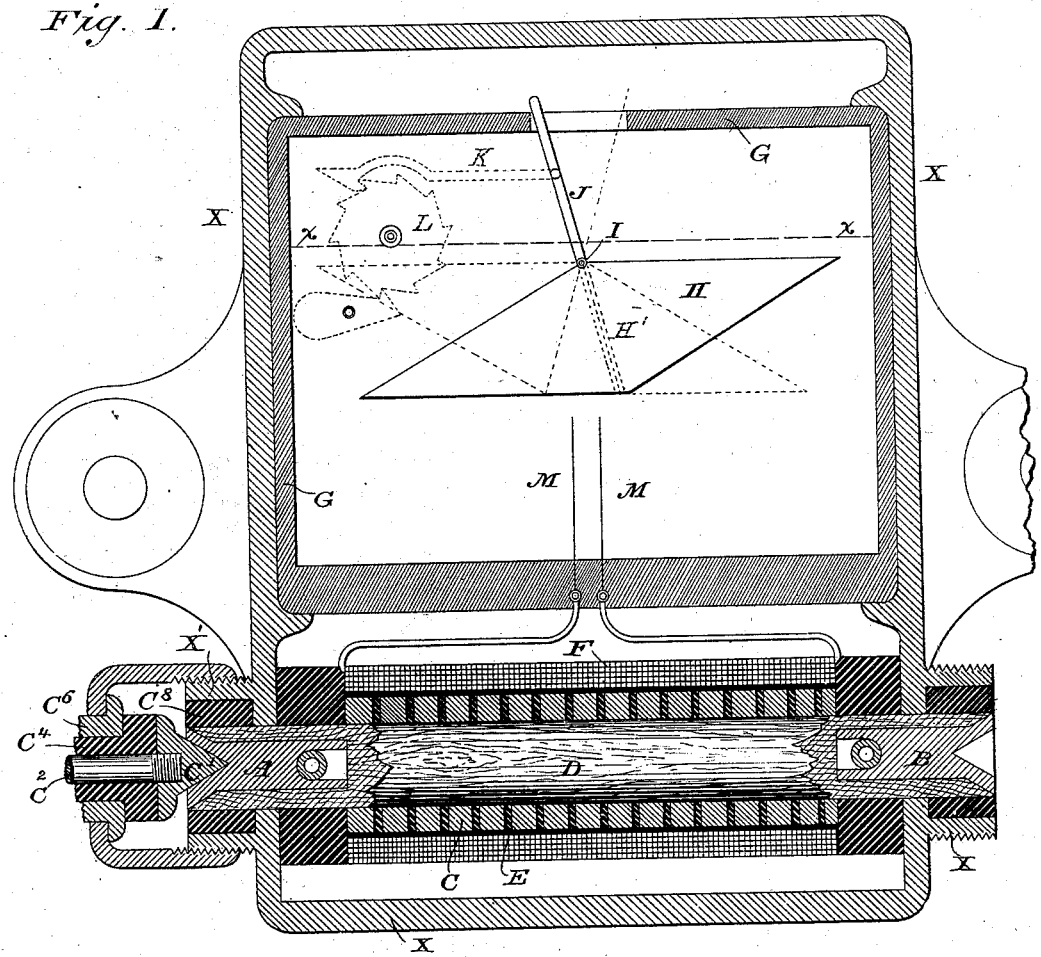

(No Model.) 3 Sheets—Sheet 1.

S. Z. DE FERRANTI & A. THOMPSON.
APPARATUS FOR MEASURING ELECTRIC CURRENTS.

No. 282,447. Patented July 31, 1883.

WITNESSES
Wm A. Skinkle
Francis D. Shoemaker

INVENTORS
S. Z. de Ferranti
Alfred Thompson
By their Attorneys
Baldwin, Hopkins & Peyton (No Model.) 3 Sheets—Sheet 2.

S. Z. DE FERRANTI & A. THOMPSON.
APPARATUS FOR MEASURING ELECTRIC CURRENTS.

No. 282,447. Patented July 31, 1883.

WITNESSES
Wm A. Skinkle
Francis D. Shoemaker

INVENTORS
S. Z. de Ferranti
Alfred Thompson
By their Attorneys
Baldwin, Hopkins & Peyton (No Model.) 3 Sheets—Sheet 3.
S. Z. DE FERRANTI & A. THOMPSON.
APPARATUS FOR MEASURING ELECTRIC CURRENTS.
No. 282,447. Patented July 31, 1883.
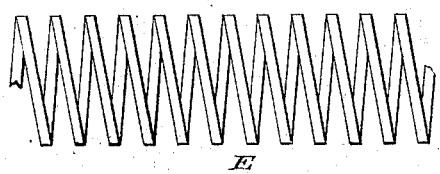
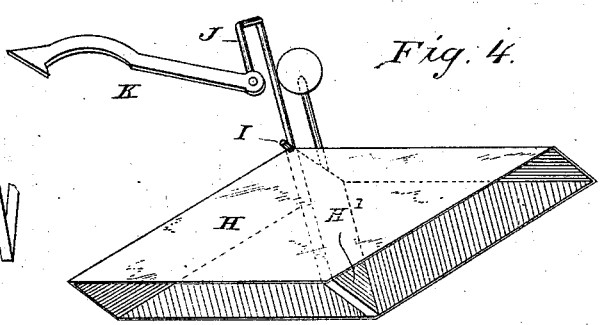
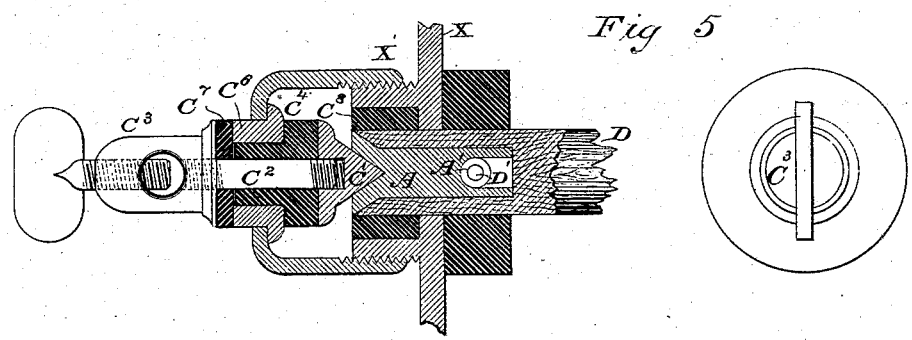
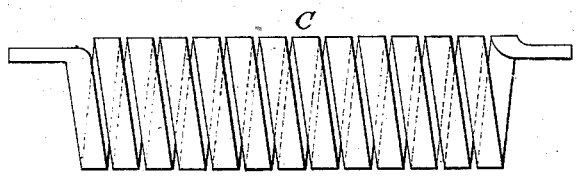
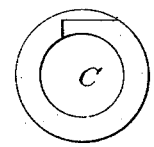
WITNESSES
Wm A. Skinkle
Francis D. Shoemaker
INVENTORS
S. Z. de Ferranti
Alfred Thompson
By their Attorneys
Baldwin, Hopkins & Peyton
N. PETERS. Photo-Lithographer, Washington, D. C.

UNITED STATES PATENT OFFICE.

SEBASTIAN ZIANI DE FERRANTI, OF RICHMOND GARDENS, SHEPHERD'S BUSH, AND ALFRED THOMPSON, OF GUILDFORD PLACE, RUSSELL SQUARE, COUNTY OF MIDDLESEX, ENGLAND.

APPARATUS FOR MEASURING ELECTRIC CURRENTS.

SPECIFICATION forming part of Letters Patent No. 282,447, dated July 31, 1883.

Application filed November 22, 1882. (No model.) Patented in England September 27, 1882, No. 4,596.

*To all whom it may concern:*

Be it known that we, SEBASTIAN ZIANI DE FERRANTI, a subject of the Queen of Great Britain, residing at Richmond Gardens, Shepherd's Bush, electrician, and ALFRED THOMPSON, a subject of the Queen of Great Britain, residing at Guildford Place, Russell Square, electrician, both in the county of Middlesex, England, have invented certain new and useful Improvements in Apparatus for Measuring Electric Currents, (for which we have received Letters Patent in Great Britain, No. 4,596, dated September 27, 1882,) of which the following is a specification.

This invention has for its object improvements in apparatus for measuring electric currents. For measuring the quantity of an alternating current passing through an electric conductor, the current is passed through the primary wire of an induction-coil. The terminals of the secondary coil are connected to two electrodes immersed in water slightly acidulated. The secondary induced current is directly proportional to the primary current, and the gas generated by the decomposition of water by the two electrodes is proportional to the current passing through the secondary coil. The amount of gas generated can be measured in any suitable apparatus such as now used for measuring gas; but preferably we employ for this purpose a small gas-measuring chamber which is open at the bottom, and at the top is carried by a central horizontal axis, on which it can rock. The horizontal axis is placed vertically above the electrodes, and a partition is carried downward from it to divide the measuring-chamber into two compartments. An arm also extends vertically upward above the axis. Its weight causes it to incline over to one side or the other, and so to incline the measuring-chamber. The extent to which it can so incline is controlled by fixed stops, against which the arm strikes. When the measuring-chamber is inclined in one or other position, both electrodes are below the lower compartment, and the gas rising up from them collects in this compartment. When sufficient gas has collected in the compartment to cause it to rise, the chamber rocks on its axis until the compartment comes into a position in which it empties itself of gas, while at the same time the other compartment comes into position above the electrodes. This latter compartment now in turn gets filled with gas, and so the operation goes on continuously. The rocking-chamber, by a pawl, is made to give a step-by-step revolving motion to a ratchet-wheel on the first spindle of a recording-train of wheels, and so the number of oscillations of the measuring-chamber are recorded.

Figure 2:
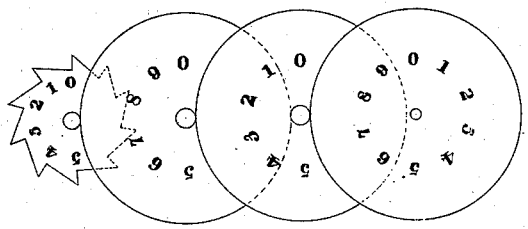
Figure 3:
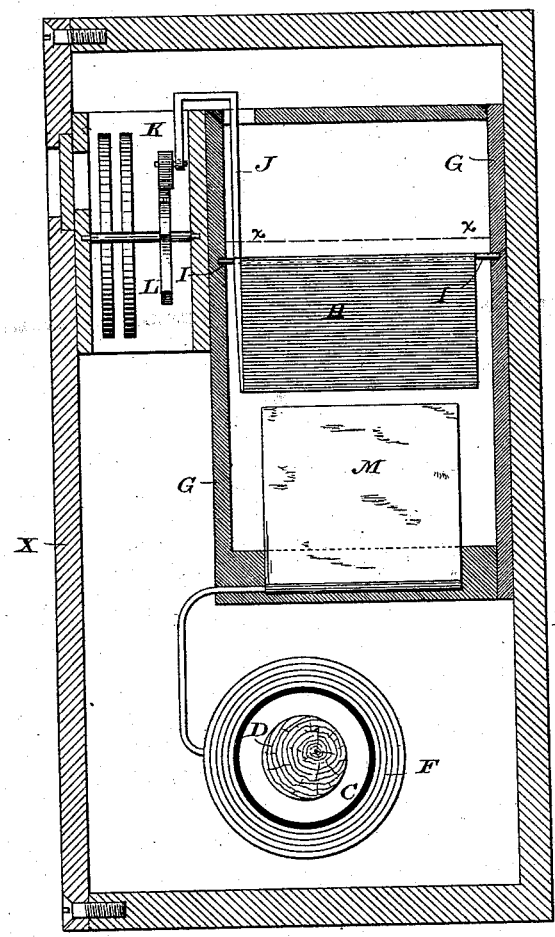

Figure 1 shows a longitudinal vertical section of measuring apparatus constructed as above described. Fig. 3 is a transverse vertical section of the same. Fig. 2 shows a train of recording-wheels. Fig. 4 shows a perspective view of the gas-measuring vessel. Figs. 5, 6, 7, 8, and 9 show the way in which we prefer to construct the induction-coil. Fig. 5 shows in section the way in which we connect the wire-main to the ends of the primary of the induction-coil. Fig. 6 shows the primary coil; Fig. 7, a side view, partly in section, of the central core of the induction-coil. Fig. 8 shows the primary coil surrounding the central core. Fig. 9 shows a coil of non-conducting material which may be used to fill the spaces between the several coils of the primary coil.

X is a cast-iron box with two lugs cast on for fixing against a wall. The box X contains an inner chamber, G, of ebonite or vulcanized fiber, made water-tight. This chamber contains water slightly acidulated with sulphuric acid. The level of the liquid is indicated by the dotted line $x$ in Fig. 1. The lower part of the cast-iron box X contains the induction-coil. This we form of a square bar, C, of copper, wound into a spiral, as shown at Fig. 6. Into this is placed a core, D, of wood or other non-conducting material. The several turns of the primary coil may be separated the one from the other by the coils of the coil E of non-conducting material being interposed between them; or this coil E of non-conducting material may be dispensed with and the spaces between the successive coils of the coil C be simply left open, without any filling of non-conducting material. A plug of metal is inserted into each end of the core D. One of these plugs is marked A, the other B. They are to form the terminals of the primary coil. The two ends of the coil C are put in metallic connection with the terminals A B by screws D', each of which, as shown at Fig. 8, clamps one end of the coil C onto a tubular metal bushing, A' or B', into which the screw D' screws. This metallic bushing enters and fits within a hole in the metallic terminal-pieces A or B. The metal plugs A B have each a conical hole formed into their outer end. Into these is held a metal cone, C', on the end of a conducting-wire, C². This wire may either be a portion of the main conductor, or it may, as shown at Figs. 1 and 5, have an ordinary screw-coupling, C³, screwed onto its end, for the main conducting-wire to be held in. The wire C² is surrounded by a piece, C⁴, of non-conducting material. To insure good contact between the cone C' and the metal plug A or B, an ordinary screw union is used, as shown at Fig. 5. It screws onto a short tubular projection, X', which stands out from the side of the box X. A flange on its outer end bears against a flange on a metallic ring, C⁶, and this ring bears against a shoulder on the piece C⁴ of non-conducting material, by which the wire C² is surrounded, and which bears against the base of the cone C'.

C⁷ is a ring of non-conducting material to separate the metallic coupling C⁵ from the metallic ring C⁶.

C⁸ is a ring of non-conducting material filling the annular space between the core D and the interior of the short cylinder X', which projects out from the side of the box X.

Around the exterior of the coil C is wound a sheet of insulating material, (shown by two dark lines in Fig. 1,) and over this are wound numerous convolutions of insulated fine wire to form the secondary coil F. The two ends of this wire are connected to two platinum plates, M, or other electrodes, which stand up from the bottom of the tank G. Above these electrodes is the vessel H, for measuring the amount of gas rising up from the electrodes. It is, as shown, divided into compartments by a plate, H'. (See Fig. 4.) The vessel H is carried by the axis I. Standing up from the axis I is an arm, J, the upper end of which can play to and fro to a certain extent in a slot in the top or cover of the tank. The outer end of the arm J carries a pawl, K, as shown at Figs. 1, 3, and 4. The pawl engages with the teeth of a ratchet-wheel, L, on the first spindle of a train of recording-wheels, such as shown at Fig. 2.

When the parts are in the position shown at Fig. 1 and an alternating current is passed through the primary of the induction-coil, gas is generated and rises from the electrodes M into the left-hand chamber of the measuring-vessel H, and collects in this chamber until the buoyancy of the gas is sufficient to cause this end of the measuring-vessel to rise. The vessel then turns into the position shown by dotted lines in Fig. 1, and the gas rising from the electrodes M is collected in the right-hand chamber, while the gas previously contained in the left-hand chamber escapes from it and passes away. The above operations are continued so long as a current is passing. As the measuring-vessel H is thus rocked to and fro the pawl K gives a step-by-step motion to the ratchet-wheel L, and so the number of movements made by the vessel H is recorded by the recording train of wheels, and so indirectly records the quantity of current passed through the primary of the induction-coil.

We claim—

1. The combination of the induction-coil, the tank containing liquid, the two terminal plates in this tank coupled to the ends of the secondary coil of the induction-coil, and a gas measuring apparatus to measure and record the volume of gas generated from the liquid whenever an alternating current is passed through the primary coil.

2. The combination of the induction-coil, the tank containing liquid, the two terminal plates therein coupled to the ends of the secondary coil of the induction-coil, the measuring-vessel H, divided into two chambers, and rocking on an axis as either one or other of these gets filled with gas, and also recording apparatus for recording the number of times that the vessel H rocks on its axis.

SEBASTIAN ZIANI DE FERRANTI.
ALFRED THOMPSON.

Witnesses:
 JNO. DEAN,
 GEO. J. B. FRANKLIN,
  Both of 17 Gracechurch Street, London.